April 14, 1931.  F. A. JOSEPH  1,801,008
CLUTCH MECHANISM
Filed Oct. 12, 1927   4 Sheets-Sheet 1

INVENTOR
Felix Alexander Joseph
BY HIS ATTORNEY

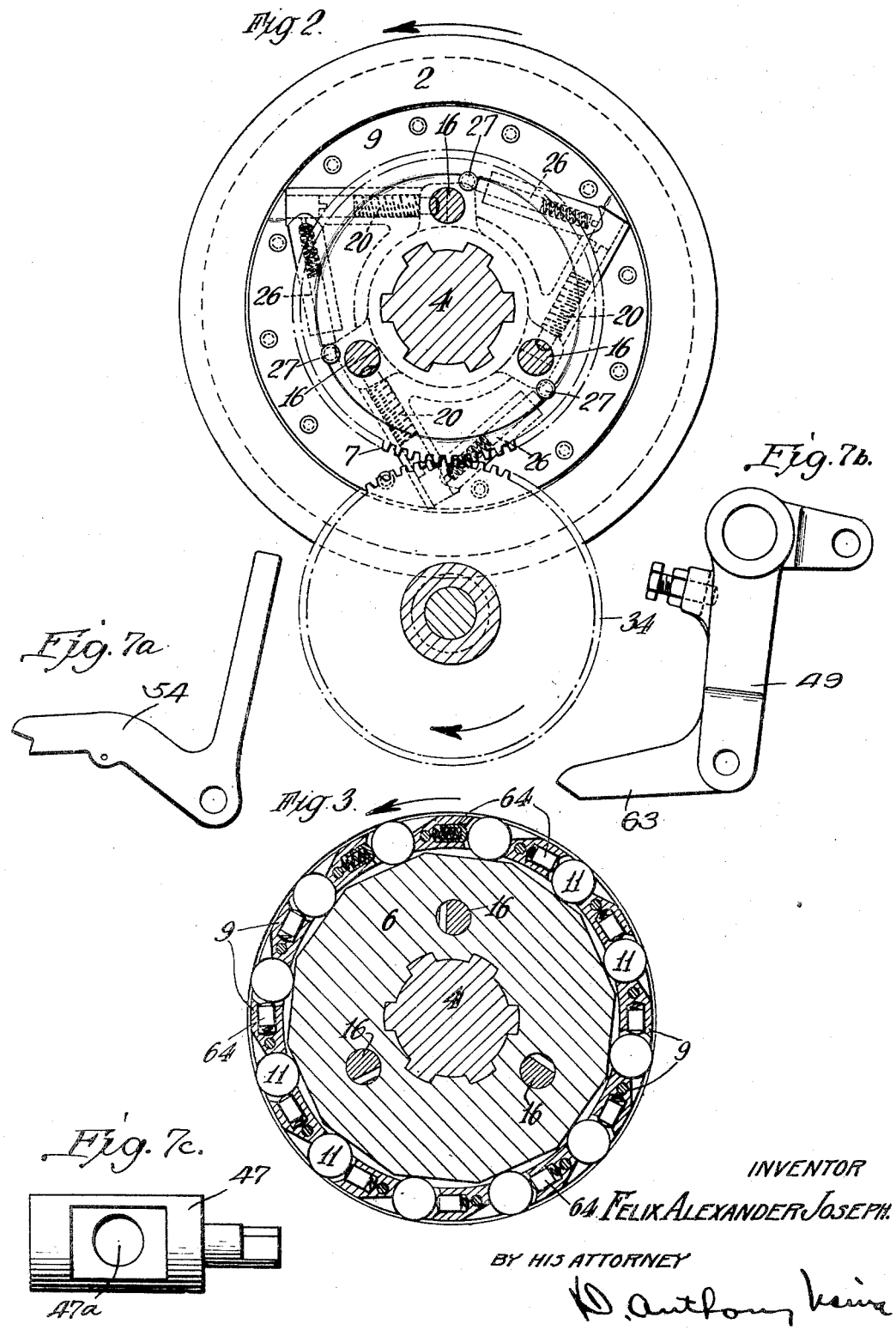

April 14, 1931.  F. A. JOSEPH  1,801,008
CLUTCH MECHANISM
Filed Oct. 12, 1927  4 Sheets-Sheet 3
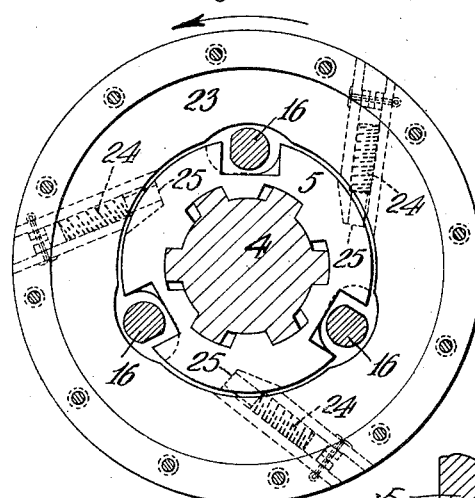
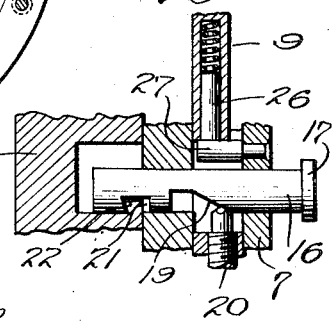
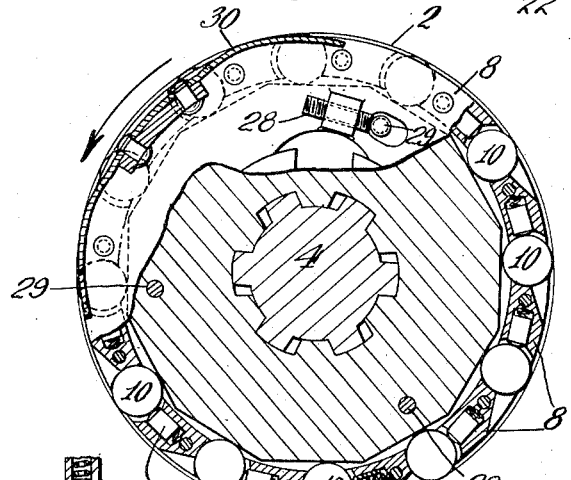
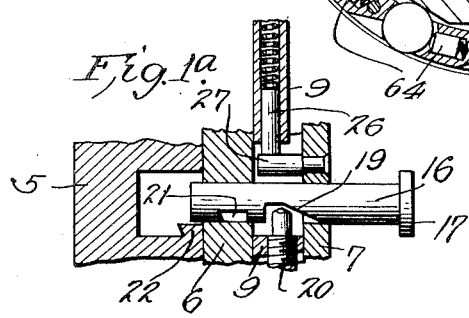
INVENTOR
FELIX ALEXANDER JOSEPH.
BY HIS ATTORNEY April 14, 1931.  F. A. JOSEPH  1,801,008
CLUTCH MECHANISM
Filed Oct. 12, 1927  4 Sheets-Sheet 4

INVENTOR
*Felix Alexander Joseph.*

BY HIS ATTORNEY

UNITED STATES PATENT OFFICE

FELIX ALEXANDER JOSEPH, OF HONG KONG, CHINA

CLUTCH MECHANISM

Application filed October 12, 1927, Serial No. 225,630, and in Great Britain November 18, 1926.

This invention relates to clutches or devices for enabling one member, which is adapted to rotate, to be coupled to another member while both members or either of them may be rotating, and has for its object improvements therein and relating thereto.

As it is well known, when two members are revolving at different speeds and are suddenly coupled together by a positive coupling device, very great shocks result, and such shocks may damage the coupling device and any other mechanism connected with it. If, however, the two members are synchronized before being positively coupled, all shock is avoided.

Apparatus made in accordance with this invention comprises driving and driven members and wedging members associated therewith in combination with means, for synchronizing the said driving and driven members prior to the engagement of the said wedging members, comprising a friction clutch effective between the said driving and driven members and means for disengaging the said friction clutch.

The invention herein described, although I do not limit its use to automobiles, is particularly applicable to facilitate gear changing in such vehicles.

One form of device made according to this invention comprises the elements of a forward unidirectional clutch and of a reverse unidirectional clutch, means for rendering inoperative the reverse unidirectional clutch and means for effecting synchronization of the said members prior to the restoration of the reverse unidirectional clutch to operative condition, said synchronizing means comprising a friction clutch operatively disposed between the said driving and driven members, and means for bringing the said friction clutch into and out of action.

Further, according to my invention I provide a control member for preventing the reverse unidirectional clutch from being restored to operative condition so long as the driven member is over-running the driving member.

Such a device is most conveniently assembled with a gear box of an automobile by associating the driven member of the gear box with the driving member of the device so that both these members are substantially in effect integral with one another.

Further, according to the present invention, means may be provided for automatically ensuring that once unidirectional uncoupling has been effected, the control member is necessarily free to lock one unidirectional clutch out of action and does so when over running of the driven member takes place.

When a torque is applied to a unidirectional clutch embodying wedging members, these members and the coacting parts of the clutch become distorted, the extent of such distortion depending on the strength of the torque. In such a condition declutching is rendered difficult, while the difficulty disappears on removal of the torque. A coupling device comprising two unidirectional clutches active in opposite directions is liable to become "jammed" even when all external torques have been removed, as explained in my patent specification No. 1,718,359, owing to the tendency of the distortion or strain produced in one unidirectional clutch distributing itself in the two clutches. In that specification I proposed using sliding rods on the cages for limiting the movement of the cages with respect to each other, and ensured that both sets of wedging members were not strained simultaneously. According to the present invention, I propose providing stops on other portions of the device, notably the driven member of the forward unidirectional clutch and making these stops adjustable, in order to be able to regulate the conditions of initial assembly of the device and also to "take up" any wear that might develop after long use. It is, of course, apparent that as the above mentioned difficulty of declutching increases with the extent of the distortion, a small distortion would not render declutching excessively difficult. Therefore if stops (whether adjustable or not) are provided which limit the extent of simultaneous distortion of the two clutches and prevent it from becoming excessive, declutching also is prevented from becoming excessively difficult.

One form of apparatus made according to the present invention is illustrated by way of example in the drawings filed herewith of which:

Figs. 1a and 1b are detail plan views of parts shown in Fig. 1.

Figure 1:
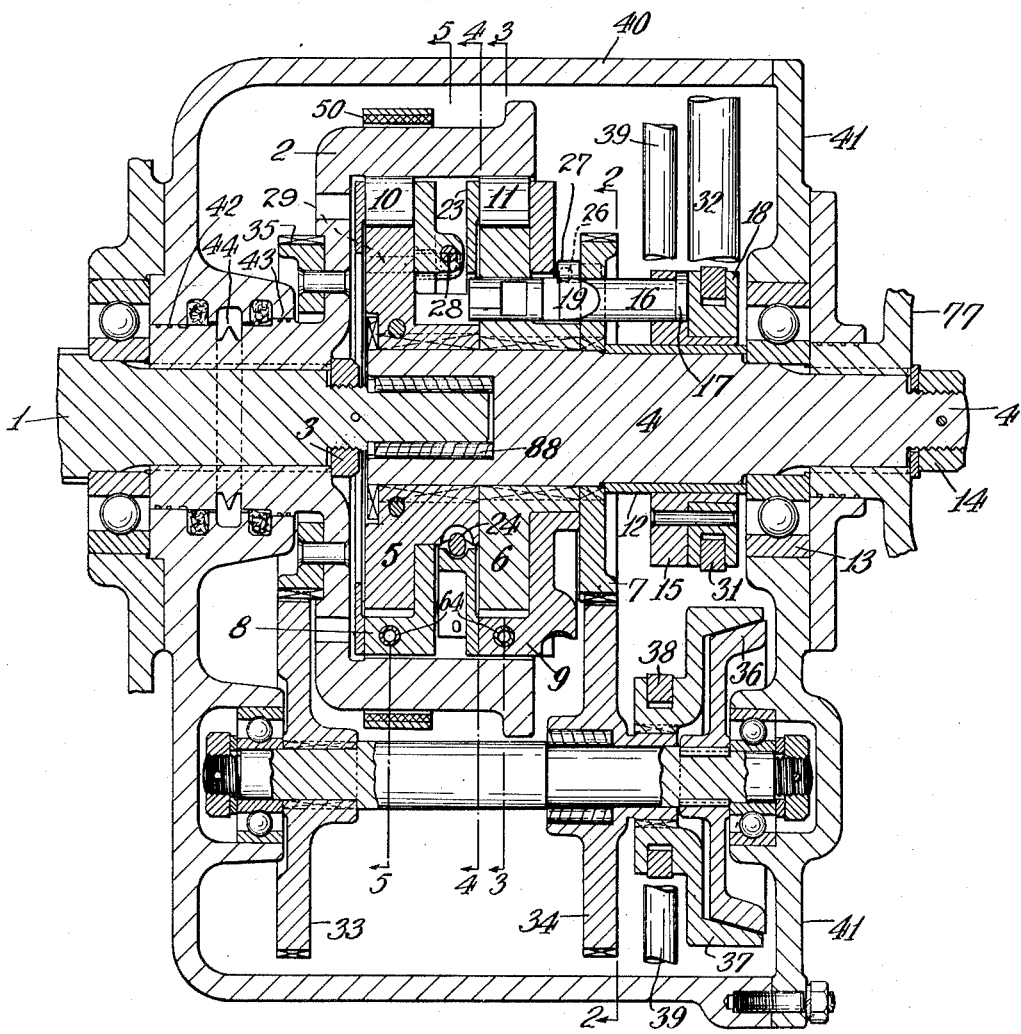
Fig. 1 is a horizontal longitudinal section.

Figs. 2, 3, 4 and 5 are transverse sections on lines 2—2, 3—3, 4—4, and 5—5, respectively, of Fig. 1.

Figure 6:
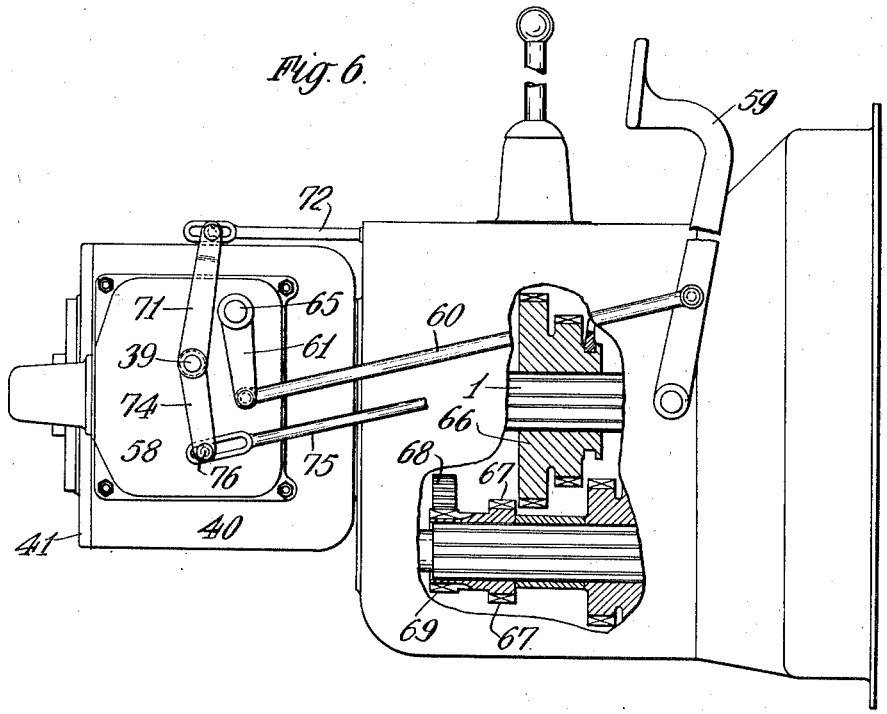

Fig. 6 is a diagram partly in longitudinal elevation and partly in section showing the device assembled in conjunction with a gear box and clutch of an automobile, the gear box being of a type in which reverse gear is obtainable by a movement of the gear lever through the position of a forward drive gear.

Figure 7:
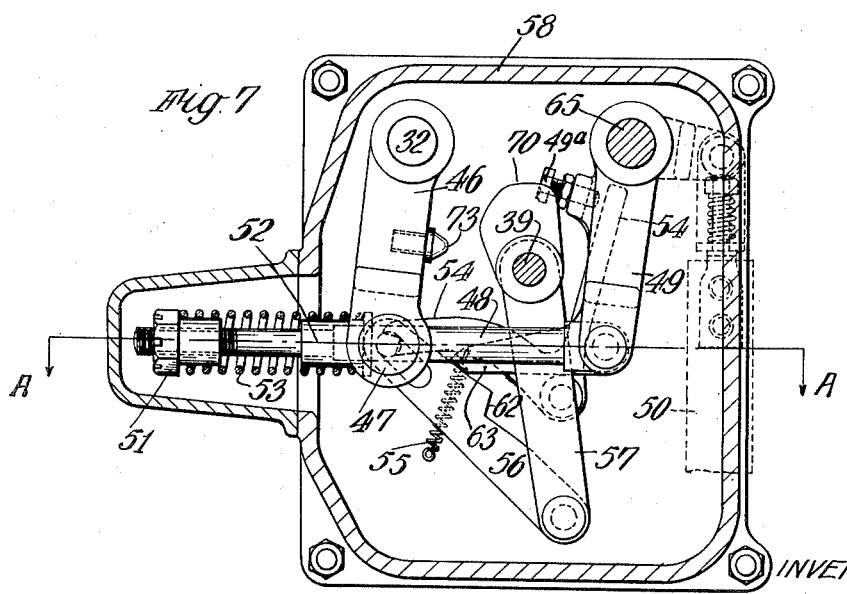

Fig. 7 shows operating mechanism external to the main casing which contains the device.

Figure 7a is a detailed view of element 54.

Figure 7b is a detailed view of the bell crank 49.

Figure 7c is a detailed view of the trunnion 47.

Referring to Figs. 1 to 7, 1 is the driving member of the device (in this case the driven member of the gear box of an automobile) which carries on splines a drum shaped member 2 held in position by the nut 3. 4 is the driven member of the device spigoted to 1 at one end on a roller bearing 88, and provided with stepped splines which carry the forward drive cam 5, reverse drive cam 6 and clamping plate 7, the periphery of which is cut to form a gear. 5 and 6 each take the form of a 12 sided polygon and carry respectively cages 8 and 9 supporting wedging members in the form of rollers 10 and 11. Cage 8 carries three adjustable pegs 28 which in Figure 5 are shown in contact with three pegs 29 riveted to cam 5. As cage 8 carries also the forward rollers 10, adjustment of pegs 28 therefore ensures that the rollers 10, carried on cage 8, are accurately positioned on the slopes of the forward cam 5 ready to wedge when the driving member 2 rotates in a forward direction, as indicated by the arrow. Pegs 28, by preventing cage 8 from moving in the clockwise direction, prevent also rollers 10 from engaging on the opposite slopes of the polygon. Spring plungers 64 serve to locate the rollers 10 and 11 in their cages. A sleeve 12, acting as a distance piece, is nipped between ball race 13 (which supports the other end of 4) and clamping plate 7 by nut 14, acting through the splined sleeve of the external driven member 77, and thereby serves to locate 6 firmly against the first step in the splines of 4. The splines of cam 5 which cam serves as the control member of the device are slightly narrower than the corresponding grooves of 4, which consequently permit 5 a limited angular movement relative to 4 (see Figs. 4 and 5). A sliding piece 15 carries three rods 16 provided with flanges 17 which are nipped between 15 and ring 18 riveted to it. Holes drilled in 6 and 7 support the rods 16, and consequently oblige 18 to rotate with driven member 4 yet permit 18 freedom of axial movement. The rods 16 are provided with slopes 19 which coact with adjustable pegs 20 on cage 9 (see Figs. 1a, 1b and 2), and with slots 21 which coact with ledges 22 cut in cam member 5 (see Figs. 1, 1a and 1b). Riveted to cage 9 is end plate 23 which carries three adjustable stops 24 which coact with flats 25 (see Figs. 1 and 4) cut in cam member 5. The stops 24 are adjusted so that they come into contact with the flats 25 of cam 5 just before the splines of cam 5 have come into driving engagement (as shown in Figure 4) with the splines of the driven shaft 4 in the forward direction (as indicated by the arrow). Cage 9 further carries three spring plungers 26 which coact with three stops 27 riveted to 7. Cage 8 carries three adjustable stops 28 which coact with stops 29 riveted to cam 5, and carries also flat bronze springs 30 which rub on the inside surface of drum 2. A fork 31 carried on trunnions (not shown) supported on shaft 32 operates ring 18 producing axial movement of the rods 16. Gears 33 and 34 are in constant mesh respectively with gear 35, riveted to 2, and gear 7, and share their respective rotation with 36 and 37, which are the two members of an auxiliary cone clutch, 37 being slidable axially on splines on a sleeve integral with 34 and operated by fork 38 mounted on trunnions (not shown) on shaft 39. The ratio of the gear train 7, 34, 33 and 35, is a slight "gear up", such that when the cone clutch is in action the rotation of 7 tends to result in a slightly more rapid rotation of 2. The whole mechanism is contained in a casing in two halves, of which 40 is bolted to the gear box and 41 to 40. The sleeve portion of drum 2 is provided with well known grooves 42 and 43 which serve to prevent lubricant in the casing of the device and the gear box from escaping, while an oil flinger 44 serves to throw off any escaped oil which is drained away from the casing through a suitable hole (not shown).

Referring to Figs. 6, 7, 7a, 7b, and 7c, 46 is a crank fixed to shaft 32 and carries a trunnion pin 47 having a hole 47a through which passes the rod 48. One end of 48 is linked with bell crank 49 which is supported through the casing on shaft 65 and operates brake band 50. The other end of 48, stepped down to a smaller diameter, is screwed to take a nut 51 between which and sleeve 52 is placed the compression spring 53. A trip 54 operated by an adjustable stop carried on 49 and return spring 55 form an escapement for the trunnion 47. One end of 47 works in a slot in link 56 pivotally connected with crank 57 fixed to shaft 39. 58 is a cover plate bolted on to the casing 40. 59 is the normal clutch pedal which carries a link 60 pinned to it at one end and at the other to crank 61 which is fixed to shaft 65 carrying bell crank 49.

In operation, assuming the car in forward motion and the mechanism in the condition as represented by all the diagrams with the exception of 1b (the direction of forward rotation of the mechanism being indicated on the drawings by arrows), the device functions as follows:—

On depressing partially the clutch pedal 59, the engine is uncoupled from the gear box, while the motion of the pedal through link 60 and crank 61 is transmitted to bell crank 49 and results first in the compression of spring 53. Further depression of 59 causes the trip 54 to release trunnion 47 and results in crank 46 being shot forward by spring 53, conveying axial motion to fork 31, sliding ring 18 and rods 16. Whereupon slopes 19 coact with pegs 20, causing a slight angular rotation of cage 9 relative to cam 6, thereby carrying rollers 11 out of their wedged position and permitting the car to over-run the gear box. In consequence the drag of flat springs 30 through cage 8 and stops 28 and 29 causes cam 5 to take up the slight angular movement permitted by its splines, thereby enabling the ledges 22 to enter the slots 21 of the rods 16 and prevent the return axial movement of these rods. It is to be noted that the moment of release is adjusted by a screw stop 49a carried on the crank 49 acting on one arm of the trip 54 so that the trip 54 does not release the trunnion pin 47 until the spring 53 has been sufficiently compressed to cause the pins 16 to be shot forward to a sufficient extent to ensure the ledges 22 of the control member 5 engaging the slots 21 of the pins 16. This state of affairs is shown in Fig. 1b, and it will also be seen that the crank 46 (Fig. 7) having already been shot forward by the spring 53 as above described is also prevented from returning to its initial position shown in Fig. 7 by the pin 16 acting through sliding piece 15, fork 31 and shaft 32. The link 56 which engages with the trunnion pin 47 (Fig. 7) is similarly prevented from returning to its normal position so that its ledge 62 in turn obstructs the return movement of extension 63 of the crank 49. Upon depressing the pedal 59 to its extreme limit of forward movement, the brake band 50 is tightened on 2, thereby arresting all motion of the gear box. This arresting of gear box motion would be assisted also by a clutch stop which may be provided to act on the driven member of the engine clutch, but which is not shown. The gear lever may now be moved from any position to any other position without risk of clashing of the gears since there are now all at rest. Upon releasing the pedal, a partial return movement of that member takes place, urged by the usual spring (not shown) of the clutch. Such movement is sufficient to release the brake band 50 (as well as engine clutch stop), but further return movement is prevented by ledge 62 of link 56, obstructing extension 63 of bell crank 49, so long as the rods 16 are held in their latched position by cam or control member 5 (as shown in Fig. 1b), and crank 46 is held in its forward position as above described. At the same time the pressure of the usual clutch spring (not shown) through pedal 59 links 60 and 61 and bell crank 49 is transmitted through extension 63, ledge 62, link 56, crank 57, shaft 39, and fork 38 to cause the two portions 37 and 36 of the auxiliary cone clutch to be engaged, and results in drum 2 being revolved and caused to overtake the speed of 4, thereupon driving the cam 5, and carrying it out of the latching position, thereby freeing rods 16 and permitting ring 18, fork 31, crank 46, link 56, bell crank 49 and clutch pedal 59 to return completely to their original positions for normal drive. In this position of the rods 16, spring plungers 26 actuating on stops 27 ensure the return of cage 9 and the rollers 11 to their wedging positions, restoring, therefore, bidirectional coupling of the device.

The gear box, shown partly in section in Fig. 6, is of the four speed type in which reverse drive is obtained by moving the sliding gear 66, past the first speed lay shaft gear 67, into mesh with the "idler" 68 of the reverse lay shaft gear 69. A cam 70, carried on a sleeve supported on shaft 39 and connected by crank 71 with sliding shaft 72 of the shifting mechanism of the gear box, coacts with a button 73 on crank 46 and ensures that when reverse gear is engaged the crank 46 is carried into its position for bidirectional coupling and cannot move into the position for unidirectional uncoupling. Furthermore, should the car be in forward motion while the gear lever be in position for forward drive and the pedal depressed, the device is then in the latched position shown in Fig. 1b, and it is not possible to push the gear lever into the position for reverse drive, as crank 46 is prevented from returning to the position corresponding to bidirectional coupling and button 73 on crank 46 obstructs the movement of cam 70. Finally, should the device be in the condition of unidirectional uncoupling with the car at rest and it be desired to engage reverse drive, the gear lever is pushed into the position for first gear, as usual, the pedal is then released from its extreme depressed position, sufficiently to enable the engine clutch members to partially engage and carry cam member 5 free of its latched position, releasing the lock on crank 46, and enabling the gear lever to be slipped past first gear position into the position for reverse drive.

Crank 74 fixed to shaft 39 is coupled by means of slotted link 75 with the hand brake (not shown) of the car, the length of 75 being so adjusted that with the hand brake "on" or normally "off", the crank pin 76 is free in the slot of 75, but when the hand brake is in a further "off" position beyond the normal "off" position, the link 75 comes into action with pin 76 and carries crank 74, and consequently fork 38 to a position which ensures that the auxiliary cone clutch is out of action. In this position of the hand brake, it is possible to effect synchronized coupling of the device by merely accelerating the engine to overtake the car, as in the device described in my patent specification No. 1,718,359, the drag or partial effect of the engine clutch being sufficient for such purpose, while when the brake is in the normal "off" position or the "on" position, synchronized coupling may be produced through the direct or assisted action of the auxiliary cone clutch.

It is to be noted that adjustable stops 24 serve the purpose of preventing the device "jamming", as explained above and in my patent specification No. 1,718,359. As explained above, the stops 24 come into engagement with flats 25 of cam 5 just before cam 5 comes into driving engagement with driven shaft 4. Consequently, this ensures that the cage 9, on which pegs 24 are mounted, has carried the reverse wedging members 11 out of wedging position before the forward wedging members 10 transmit the load of forward drive. Similarly, when reverse wedging members 11 are transmitting reverse drive and the cage 9 is in a corresponding position, the pegs 24 prevent the cam 5 from being in forward driving engagement with driven shaft 4. It is, therefore, clear that adjustment of pegs 24 serves to determine the extent of "backlash" between forward and reverse drives, and enables excessive "backlash", which may develop after long use, to be "taken up."

It will be noticed also that the apparatus herein described differs from that described in my patent specification No. 1,718,359 in the following respect, viz., that the ledges 22 are carried on cam or control member 5 which is movable within small angular limits with respect to driven member 4, whereas in that specification it was the cage $h^2$ which functioned as the control member and was permitted the small angular movement necessary for latching and unlatching.

It will be noticed that in the apparatus described herein the control member is substantially the driven member of the forward unidirectional clutch, but it is to be understood that the term "control member" is not to be construed as synonymous with the said driven member, and may be a distinct member, as for example the member $H^2$ (Fig. 3) in my patent specification No. 1,718,359; or, in the case of a device having only a single cam, the member $g$ (Fig. 1) of the said specification.

I wish it to be clearly understood that the invention herein described may be applied to any form of unidirectional clutch or free-wheel device and that the term "wedging members" is not necessarily to be associated with any particular form of "free-wheel" or unidirectional clutch.

What I claim and desire to secure by Letters Patent is:—

1. In apparatus for coupling rotary driving and driven members the elements of a forward unidirectional clutch and of a reverse unidirectional clutch, means for rendering inoperative the reverse unidirectional clutch and means for effecting synchronization of the said members prior to the restoration of the reverse unidirectional clutch to operative condition, said synchronizing means comprising a friction clutch operatively disposed between the said driving and driven members, and means for bringing the said friction clutch into and out of operation.

2. In apparatus for coupling rotary driving and driven members the elements of a forward unidirectional clutch and of a reverse unidirectional clutch, means for rendering inoperative the reverse unidirectional clutch and means for effecting synchronization of the said members prior to the restoration of the reverse unidirectional clutch to operative condition, said synchronizing means comprising a friction clutch operatively disposed between the said driving and driven members, means for bringing the said friction clutch into and out of action and a control member for preventing the reverse unidirectional clutch from being restored to operative condition so long as the driven member is over-running the driving member.

3. In a coupling device comprising driving and driven members and wedging members associated therewith in combination with means, for synchronizing the said driving and driven members prior to the engagement of the said wedging members, a control member for preventing the engagement of the wedging members in at least one direction until synchronization of the driving and driven members has been attained and means for bringing the said control member of necessity into action whenever the driven member of the device over-runs the driving member.

4. In a coupling device comprising driving and driven members and wedging members associated therewith in combination with means for synchronizing the said driving and driven members prior to the engagement of the said wedging members, a control member for preventing the engagement of the wedging members in at least one direction until synchronization of the driving and driven members has been attained, the said means for preventing the engagement of the wedging members comprising a longitudinally slidable member and a spring and trip mechanism for ensuring that once the wedging members have been rendered inoperative the longitudinally slidable member is of necessity carried into a position in which the control member is free to engage with it.

5. In a coupling device comprising driving and driven members and wedging members associated therewith, means for preventing engagement of the said wedging members in at least one direction and an engageable and disengageable friction clutch effective between the said driving and driven members, the said friction clutch being adapted to be re-engaged to effect synchronization of the said driving and driven members prior to the re-engagement of the said wedging members, at all speeds of rotation.

6. In a coupling device comprising driving and driven members and wedging members associated therewith, means for preventing engagement of the said wedging members in at least one direction, and an engageable and disengageable friction clutch effective between the said driving and driven members, the said friction clutch being adapted to be reengaged to effect synchronization of the said driving and driven members prior to the re-engagement of the said wedging members, at all speeds of rotation, the said means for preventing engagement of the said wedging members in at least one direction comprising a control member adapted to be put out of action automatically as soon as synchronization has been effected.

7. In a coupling device comprising driving and driven members and wedging members associated therewith, the said wedging members together with the said driving and driven members constituting the elements of two opposite unidirectional clutches, means for preventing engagement of the said wedging members in at least one direction and an engageable and disengageable friction clutch effective between the said driving and driven members, the said friction clutch being adapted to re-engage to effect synchronization and the driving and driven members prior to the reengagement of the said wedging members, at all speeds of rotation.

8. In a coupling device comprising driving and driven members and wedging members associated therewith, the said wedging members together with the said driving and driven members constituting the elements of two opposite unidirectional clutches, means for preventing engagement of said wedging members in at least one direction and an engageable and disengageable friction clutch effective between the said driving and driven members, the said friction clutch being adapted to re-engage to effect synchronization of the driving and driven members prior to the re-engagement of the said wedging members at all speeds of rotation, in combination with means for preventing simultaneous strains being set up in the said two uni-directional clutches.

9. In a coupling device comprising driving and driven members and wedging members associated therewith, the said wedging members together with the said driving and driven members constituting the elements of two opposite unidirectional clutches, means for preventing engagement of said wedging members in at least one direction and an engageable and disengageable friction clutch effective between the said driving and driven members, the said friction clutch being adapted to re-engage to effect synchronization of the driving and driven members prior to the re-engagement of the said wedging members at all speeds of rotation, in combination with means for limiting the extent of simultaneous strains being set up in the two unidirectional clutches, said limiting means comprising stops disposed on the said elements of the said clutches.

10. In a coupling device comprising driving and driven members and wedging members associated therewith, means for preventing engagement of the said wedging members in at least one direction and an engageable and disengageable friction clutch effective between the said driving and driven members, the said friction clutch being adapted to be re-engaged to effect synchronization of the said driving and driven members prior to the re-engagement of the said wedging members, at all speeds of rotation, in combination with mechanism for operatively connecting the engine clutch pedal with the said means for preventing the engagement of the said wedging members in at least one direction, means for putting the said friction clutch into engagement and means for automatically preventing the engine clutch from being re-engaged so long as synchronization of the said driving and driven members has not taken place.

In testimony whereof I have signed my name to this specification.

FELIX ALEXANDER JOSEPH.